United States Patent [19]

Westeren et al.

[11] E Re. 29,881

[45] Reissued Jan. 16, 1979

[54] METHOD OF VACUUM CARBURIZING

[75] Inventors: Herbert W. Westeren, Barrington; Vincent Scotto, Warwick; Ernest C. Gronquist, Jr., Providence, all of R.I.; Donald A. Taft, Orange, Calif.

[73] Assignee: C. I. Hayes Inc., Cranston, R.I.

[21] Appl. No.: 562,197

[22] Filed: Mar. 26, 1975

Related U.S. Patent Documents

Reissue of:

[64] Patent No.: 3,796,615
Issued: Mar. 12, 1974
Appl. No.: 155,950
Filed: Jun. 23, 1971

[51] Int. Cl.[2] ..... C23C 11/10

[52] U.S. Cl. ..... 148/16.5; 148/20.3

[58] Field of Search ..... 148/14.0, 16.0, 16.5–16.6, 148/20.3; 266/2 R, 5 C, 5 R

[56] References Cited

U.S. PATENT DOCUMENTS

| | | | |
|---|---|---|---|
| 1,768,317 | 6/1930 | Guthrie et al. | 148/16.5 |
| 2,565,360 | 8/1951 | Dufilho | 148/16.6 |
| 3,168,607 | 2/1965 | Greene | 148/20.3 |
| 3,202,553 | 8/1965 | Greene | 148/20.3 |
| 3,519,257 | 7/1970 | Winter et al. | 148/16.5 |
| 3,620,518 | 11/1971 | Winter et al. | 148/16 |

FOREIGN PATENT DOCUMENTS

| | | | |
|---|---|---|---|
| 692161 | 8/1964 | Canada | 148/16.5 |
| 1555588 | 12/1968 | France | 148/14 |
| 801463 | 9/1958 | United Kingdom | 148/14 |

*Primary Examiner*—Walter R. Satterfield
*Attorney, Agent, or Firm*—Salter & Michaelson

[57] ABSTRACT

A method and apparatus of vacuum carburizing by changing the surface chemistry of a metal article through absorption and thermal diffusion of carbon, wherein oxidizing gases and other impurities are initially removed from the chamber in which the metal article is treated by evacuation and the temperature in the chamber is maintained at a level above normal carburizing temperatures, but at a point that is compatible with the physical characteristics of the chamber and the article; whereafter a source of carbon is introduced into the evacuated chamber in accordance with a preselected cycle and at a concentration that is controlled by the absolute pressure of the carbon in the chamber, so that the carbon is absorbed and diffused into the metal article at a controlled rate.

5 Claims, 13 Drawing Figures

INVENTORS
HERBERT W. WESTEREN
DONALD A. TAFT
VINCENT SCOTTO
ERNEST C. GRONQUIST, JR.
BY Salter & Michaelson
ATTORNEYS INVENTORS
HERBERT W. WESTEREN
DONALD A. TAFT
VINCENT SCOTTO
BY ERNEST C. GRONQUIST, JR.
Salter & Michaelson
ATTORNEYS INVENTORS
HERBERT W. WESTEREN
DONALD A. TAFT
VINCENT SCOTTO
ERNEST C. GRONQUIST, JR.
BY Salter & Michaelson
ATTORNEYS INVENTORS
HERBERT W. WESTEREN
DONALD A. TAFT
VINCENT SCOTTO
BY ERNEST C. GRONQUIST, JR
Salter & Michaelson
ATTORNEYS

METHOD OF VACUUM CARBURIZING

Matter enclosed in heavy brackets [ ] appears in the original patent but forms no part of this reissue specification; matter printed in italics indicates the additions made by reissue.

BACKGROUND OF THE INVENTION

The method and apparatus as embodied in the present invention relates to carburizing by absorption and thermal diffusion of carbon into a metal article in a subatmospheric environment, wherein a carburized case on the metal article is inexpensively and effectively produced.

Changing the surface chemistry of a metal article by thermal diffusion of carbon into the surface of the article so that a hardened case may be produced has long been known in the art, and it is inherent in the case hardening of steel, for example, by carburizing, that the carburizing medium supply an adequate quantity of carbon for adsorption and diffusion into the steel. Prior to the instant invention, carburizing processes have included liquid carburizing using a salt bath, gas carburizing using a gaseous medium as a source of carbon, and pack carburizing using a powdered material as a source of carbon.

The present invention has particular application in gas carburizing and is an improvement over the prior known processes that subjected the metal articles to be treated to a carburizing atmosphere that was force circulated by a fan in the chamber in which the articles were located. Usually a hydrocarbon gas as found in natural gas was employed in the prior known carburizing processes, and in most gas carburizing furnaces a carrier gas such as an endothermic gas was used in combination with the hydrocarbon gas as the carburizing medium, and this medium was circulated in the furnace chamber and under prescribed time and temperature conditions.

It is known that the rate of absorption and diffusion of carbon into steel is an exponential function with respect to the carburizing temperatures. Hence, the higher the temperatures, the greater the rate of absorption and diffusion. However, present furnaces for use in carburizing are limited in the operating temperature ranges, and prior to the instant invention such furnaces have been limited to operating in the range of 1750° F.–1850° F. Any increase in the operating temperature range of the prior known furnaces would cause the refractory brick heating elements and parts in the furnace heating chamber to break down. Although conventional carburizing furnaces could be constructed to withstand high temperatures, the cost thereof would be prohibitive.

The prior known atmosphere furnaces which used an endothermic atmosphere as the carrier gas required long purge cycles to rid the furnace of foreign gases and to establish an acceptable environment for carburizing. This necessarily increased the time factor in carburizing which has been one of the main objections to the prior known carburizing processes.

The prior known carburizing furnaces which were gas or oil fired used multi-zone arrangements which considerably increased the size of the furnace over a conventional heat treating furnace. Further, the endothermic atmosphere used continually polluted the air as it was vented through stacks and required some kind of pollution control which again increased the cost of the process.

SUMMARY OF THE INVENTION

The present invention has general application in the carburizing of metals, and more specifically relates to carburizing in a subatmospheric environment. The method as embodied in the present invention provides for evacuating a chamber in which a metal article to be treated is placed, so as to remove the impurities therefrom and thereafter back-filling the chamber with an atmosphere containing a source of carbon for a predetermined cycle while maintaining the temperature in the chamber at a level that will provide for absorption and thermal diffusion of the carbon into the surface of the article. In the more specific application of the invention, the chamber is alternately avacuated and then back-filled with the source of carbon for a predetermined number of cycles, wherein effective circulation of the carbon source is obtained to produce the required absorption and diffusion of the carbon into the surface of the metal.

Accordingly, it is an object of the present invention to teach a process of carburizing a metal article, wherein the absorption and thermal diffusion of carbon is accomplished in an evacuated chamber.

Another object of the invention is to teach a method of carburizing metallic articles in a vacuum, wherein a source of carbon is periodically introduced into an evacuated chamber and removed therefrom as absorption and diffusion of carbon occurs in the metal.

Sill another object is to provide apparatus for carburizing metal materials and includes a vacuum furnace in which the metal material is placed, the apparatus further including means for alternately evacuating the heating chamber and introducing therein a source of carbon while maintaining the heating chamber under subatmospheric conditions, wherein absorption and thermal diffusion of the carbon into the surface of the metal material at a controlled rate is effectively obtained.

Still another object is to teach a process of changing the surface chemistry of a metal article by thermal diffusion of carbon therein, wherein a source of carbon is introduced into an evacuated chamber and at a concentration that is controlled by the absolute pressure of the chamber, wherein the carbon is absorbed into the outer surface of the article at a controlled rate.

Still another object is to teach a carburizing process that provides for carburizing at relatively high temperatures.

Still another object is to provide carburizing apparatus that is pollution free.

Still another object is to teach a process for carburizing wherein the carburizing cycle is greatly reduced over that known heretofore.

Other objects, features and advantages of the invention shall became apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
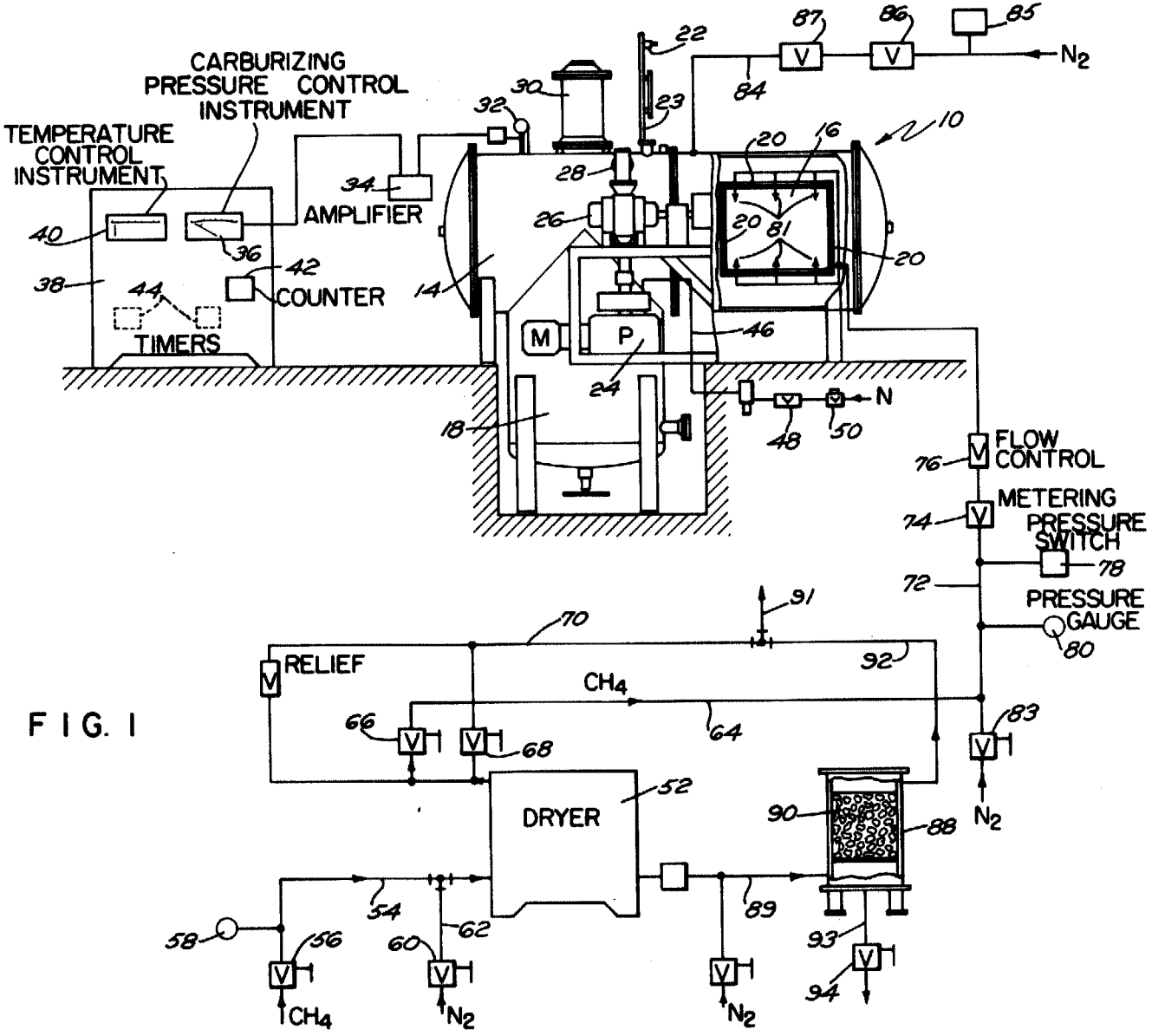
FIG. 1 is a diagrammatic illustration of the apparatus as embodied in the present invention.

Referring now to the drawings and particularly to FIG. 1, the apparatus for carrying out the process as embodied in the present invention is illustrated and includes a vacuum furnace generally indicated at 10. The vacuum furnace 10 includes a housing 14 in which a heating chamber 16 is located, and as illustrated, the furnace also includes a cooling area under which a quench tank 18 is located, wherein the parts or articles carburized by the process to be described are moved after the carburizing cycle is completed. The arrangement and construction of the furnace 10 is more clearly illustrated and described in co-pending application Ser. No. 770,779 entitled Vacuum Furnace With Elevator Oil Quench, filed Oct. 25, 1968. As described in the aforesaid copending application, the heating chamber 16 is provided with graphite heating elements that are enclosed by insulated graphite cloth members indicated at 20 in FIG. 1. A valve 22 is automatically operated to control a vertically movable member 23 that is interconnected to a door that controls communication between the heating chamber 16 and the cooling area located above the quench tank 18. A vacuum pump 24 communicates with the interior of the housing 14 through a blower 26 and a control valve 28 and is operative to evacuate the interior of the housing 14 to the required vacuum. A motor 30 mounted on the top of the housing 14 controls the operation of a fan located within the housing, the fan being of usual construction and being employed for cooling the heated metal articles in the cooling area under certain prescribed conditions.

Controlling the absolute pressure within the housing 14 is a critical part of the process as embodied in the present invention, and a pressure sensing element 32 located on the housing 14 and communicating with the interior is provided for this purpose. The sensing element 32 is interconnected to an amplifier 34 which is operative to produce an electrical signal that is indicated on a carburizing pressure control instrument 36 mounted on a control panel 38. The pressure control instrument 36 is electrically connected to the control valve 28 for controlling the position thereof. Thus by setting the pressure control instrument 36 at a preselected value, the valve 28 can be opened to provide for evacuation of the housing 14 by the pump 24 to the required absolute pressure therein. A temperature control instrument 40 is also located on the panel 38 and communicates with the means for energizing the graphite heating elements that are located within the heating chamber 16. The temperature within the heating chamber 16 is thereby controlled by setting the temperature control instrument 40 as required. As will hereinafter be described, a counter 42 and timer 44 are also located on the panel 38 and form part of the operating equipment for carrying out the carburizing cycle.

As a safety precaution, nitrogen can be introduced into the exhaust manifold of the pump 24, thereby avoiding a combustible mixture during pump out, and this is provided through a line 46 that communicates with a control valve 48 and a solenoid operated valve 50.

The process as embodied in the present invention is designed to provide a source of carbon in a subatmospheric environment within the furnace heating chamber 16, and for this purpose any convenient carbon source may be provided. However, it has been found expedient to use city gas which includes methane ($CH_4$) as the carbon source, but since methane does contain certain impurities such as mercaptan, it is necessary to direct the gas through an atmosphere drying chamber indicated at 52 in FIG. 1. The atmosphere drying chamber 52 is generally of the type illustrated and disclosed in U.S. Pat. No. 2,979,828 and includes a desiccant material therein that removes moisture and impurities from the natural gas directed therethrough.

As further illustrated in FIG. 1, the natural gas from the city line is introduced into the dryer 52 by way of a line 54 that is controlled by a valve 56. A pressure guage 58 is connected in the line 54 for indicating the pressure of the gas as introduced into the dryer 52, and a valve 60 controls a purge line 62 through which nitrogen as a purge gas may be introduced into the dryer 52. The methane gas is directed from the dryer 52 into the heating chamber 16 of the furnace through a line 64 that is controlled by a cut-off valve 66. A valve 68 that is normally closed communicates with a vent line 70 and may be used to vent the gas when required. The line 64 further communicates with a line 72 in which a metering valve 74 is located that meters the flow of the gas to the heating chamber 16. A flow control valve 76 is also located in the line 72 and is controlled by the pressure control instrument 36 for admitting the carburizing gas into the heating chamber 16 as required. A pressure switch 78 and gauge 80 connected in the line 72 provides further control of the flow of the carburizing gas to the heating chamber 16, which is admitted to the chamber 16 through a plurality of jets 81 that are preferably formed of a graphite material which resists contamination at elevated temperatures. The pressure switch 78 functions to cut off the operation of the furnace should the pressure in the line 72 go to a negative value. Purging of the line 72 at initial start up may be accomplished by admitting nitrogen through a shut-off valve 83. As will be described, the chamber 16 is backfilled with nitrogen after the carburizing cycle for heat treatment of the work parts and prior to the removal of the work parts from the furnace. For this purpose a line 84 communicates with a source of nitrogen and with the heating chamber 16 through a pressure switch 85, a solenoid valve 86, and a control valve 87.

Although the dryer 52 does not constitute apparatus that defines part of the carburizing cycle, it does perform the important function of purifying the carburizing gas prior to its being introduced into the heating chamber 16. Periodically the desiccant material in the dryer 52 must be regenerated, and for this purpose a purge gas such as nitrogen is introduced therein. In this event, the purge exhaust is directed to a chamber 88 by way of a line 89, the purge exhaust filtering through a bed of particulate material such as iron oxide chips indicated at 90 that removes noxious materials such as mercaptan from the purge gas prior to its being directed to a vent or stack 91 by means of a line 92. A drain line 93 is located at the lower end of the tank 90 and is controlled by a valve 94.

As described hereinabove, the furnace heating chamber 16 includes a plurality of graphite heating elements that may either be in solid or woven graphite form, and in this connection reference is made to U.S. Pat. Nos. 3,257,492 and 3,525,795, wherein woven graphite heating elements are disclosed both in planular and in tubular form. The use of graphite heating elements is desirable in the present invention since the carburizing temperatures are relatively high and above normal carburizing temperatures, and even at these high temperatures the graphite heating elements will not deteriorate or break down. Since the carburizing process herein is carried out in a subatmospheric environment, conventional heating elements cannot be used because they would be carburized at the high temperatures and eventually break down and fail. As will be discussed, the higher temperatures used in the carburizing process herein are desirable since the rate of carbon absorption into the article being carburized is increased exponentially with respect to the increase in temperature of the furnace. As will be further described, the vacuum pressures as incorporated herein enable the article to be properly prepared for carburizing, and a prescribed carburized case can be obtained since carbon potential as absorbed in an article is proportional to the absolute pressure within the furnace heating chamber.

One of the unique features embodied in the carburizing process of the subject invention is the introduction of the carburizing gas to the heating chamber 16 of the furnace at predetermined intervals. Since the carburizing cycle is accomplished entirely in a subatmospheric environment, withdrawal of the carburizing gas from the furnace chamber can be easily accomplished with the vacuum furnace 10 as described above. Hence, it has been found that by alternately introducing the carburizing atmosphere into the heating chamber and then evacuating it for a predetermined cycle the carbon as contained in the carburizing atmosphere will be absorbed more readily into the surface of the article being treated. This so called "pulsing" effect tends to remove unwanted molecules of the carburizing environment from around the part being treated; and upon reintroduction of the carburizing atmosphere into the heating chamber after evacuation thereof, the carbon in the carburizing gas will be more readily absorbed into the article. Further, the pulsing effect produces a better distribution of the carbon around the article, and in certain articles that are formed with irregular surfaces, the pulsing technique as provided for in the carburizing cycle insures that sufficient carbon will be diffused into the metal to produce the required result.

By utilizing the pulsing technique and precisely controlling the vacuum and temperature in the heating chamber, the carburizing cycle can be controlled so that residual absorption or diffusion is prevented and carburized cases having predetermined characteristics such as case depth, carbon potential and hardness can be obtained.

Figure 2:
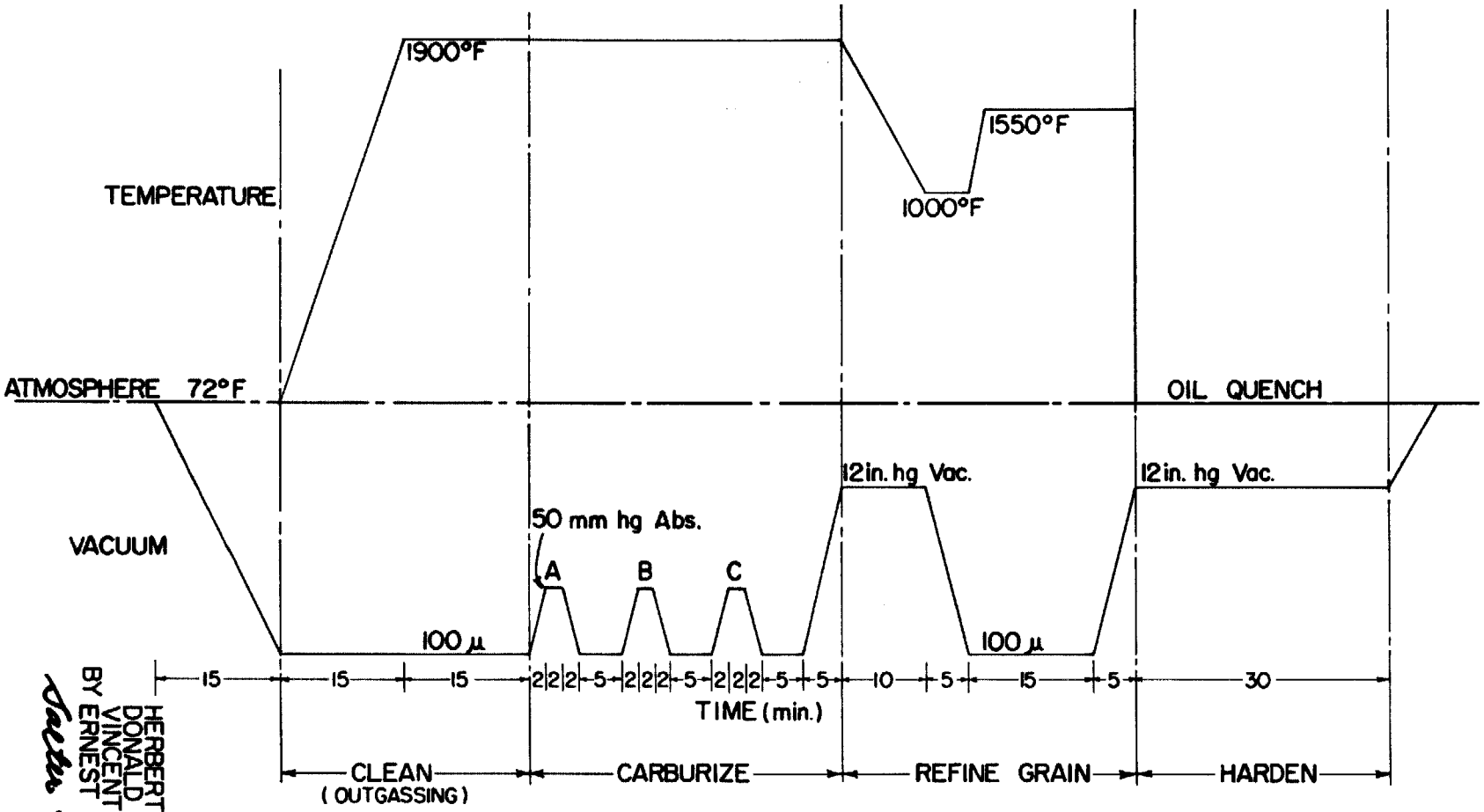
FIG. 2 is a diagrammatic analysis of one example of an operating cycle as embodied in the present invention.

In order to better understand the carburizing process as embodied herein, reference is made to FIG. 2 which is a diagrammatic illustration of one example of an operating cycle. The center line in FIG. 2 represents atmospheric pressure and room temperature. The values above the center line represent the temperature of the furnace during the process and the values below the center line represent the absolute pressure or vacuum in the furnace chamber. Both temperature and vacuum are correlated to the time of the operating cycle. Prior to beginning the operating cycle for carburizing a work part, it is essential that the heating chamber including the heating elements and parts therein and the work part be out-gassed and deoxidized so that there are no impurities remaining in the heating chamber during the carburizing cycle. Outgassing is accomplished after the work part has been placed in the heating chamber 16 and the valve 28 opened and the pump 24 of the furnace 10 energized to pump out the housing interior and the heating chamber. A vacuum control instrument (not shown) is preset, so that when the furnace chamber has been pumped down to a preset value the power to the furnace heating element is energized to begin the outgassing. The furnace temperature is preset, and in the normal operating cycle, 1900° F. is the furnace temperature used, since parts processed at this temperature are easily outgassed and deoxidized and the work part will absorb carbon at an accelerated rate to produce the required carburized case. However, it is understood that any temperature including relatively high temperatures can be used as the carburizing temperature for the furnace, usually depending upon the kind of material being treated. For example, molybdenum may require still a higher carburizing temperature, and this temperature could be in the range of 2700°-3000° F. Tungsten requires still a higher carburizing temperature, and this temperature could be in the range of 2700°-3000° F. It is understood, however, that the temperature in the furnace is considerably higher than the carburizing temperatures used in the prior known carburizing processes.

A timer (not shown) is preset to provide for outgassing of the heating chamber at the selected temperature and vacuum for a predetermined period of time. In most instances a fifteen to thirty minute soak or outgassing time at approximately 100 microns is sufficient to remove all oxidizing gases and other impurities from the heating chamber. When the period for outgassing ends, the carburizing cycle automatically begins.

Prior to beginning the operation of the furnace and the carburizing process, the operator preselects the number of pulses that will be required to produce a selected carburized case and will also select the period of time for each pulse. Referring again to FIG. 1, counter 42 is preset to control the number of pulses, or the number of times that the carburizing gas will be introduced into the chamber 16, and the timer 44 is preset to control the length of time the carburizing atmosphere remains in the chamber and before the pump out thereof. The absolute pressure or vacuum at which the carburizing cycle is performed is also preselected and this is controlled by the carburizing pressure control instrument 36. As will be described, the depth of the carburized case obtained can be determined by the number of pulses in a carburizing cycle, and the percent of carbon as contained in the carburized case would also be determined by the absolute pressure of the heating chamber with the carburizing gas contained therein. In this connection as the absolute pressure is varied within the heating chamber, and the number of pulses selected for a carburizing cycle are varied, the percent of carbon in the carburized case of the work part will vary up to 2.2% carbon saturation point. This relationship will be more fully discussed hereinafter.

Referring again to FIG. 2, the example of the operating cycle shows the pump out beginning at atmospheric pressure and 72° F. and in approximately fifteen minutes the furnace chamber is pumped down to 100 microns vacuum. At this point the heating elements in the heating chamber 16 are energized and in approximately fifteen minutes the operating temperature of 1900° F. is reached. Outgassing occurs for another fifteen minutes with the furnace chamber at approximately 100 microns. As indicated in FIG. 2, this thirty minute interval constitutes a cleaning or outgassing portion of the operating cycle. The carburizing cycle now begins and the carburizing pressure control instrument as controlled by the counter 42 and the timer 44 operates to close the pump valve 28 and to open the flow control valve 76 through which the carburizing gas containing methane ($CH_4$) flows to the heating chamber 16. In the example illustrated in FIG. 2, the chamber 16 is backfilled with the carburizing gas to 50 mm. Hg absolute pressure (pulse A) and this backfill time takes approximately two minutes. The flow control valve 76 is then closed to prevent additional carburizing gas from entering the chamber 16. The carburizing gas may be promptly pumped out of the chamber 16 by having the controls set to immediately open the pump valve 28, or as illustrated in FIG. 2, an absorption period of two minutes is provided before pump out begins. In this connection the pressure control instrument 36 opens the valve 28 and pump out of the carburizing atmosphere proceeds for about two minutes until the vacuum of 100 microns is again reached, at which point the valve 28 is again closed. Since the carbon in the carburizing atmosphere has already been absorbed into the surface of the metal part, diffusion is now provided for by holding the vacuum in the chamber at the pump out pressure of approximately 100 microns and allowing a so-called diffusion period to continue for another five minutes. The second pulse (B) of the operating cycle for introducing another shot of carburizing gas into the chamber 16 is accomplished by closing the valve 28 again and opening the flow control valve 76. The carburizing gas is again permitted to flow into the chamber 16 for another two minutes until 50 mm. Hg backfill pressure is reached, at which time both valves 28 and 76 are again closed. After a two minute absorption period, the carburizing gas is pumped out in two minutes until the furnace chamber reaches 100 microns and diffusion is continued for another five minutes. A third pulse (C) as illustrated in FIG. 2 provides for another shot of carburizing gas, and after this pulse is completed and the diffusion period ends, the counter 42 automatically signals the vacuum control instrument to open the valves 86 and 87 for introducing a source of nitrogen from line 84 into the heating chamber to reduce the vacuum therein to 12 in. Hg. This completes the carburizing cycle.

In the commercial use of the process, it is contemplated that the work parts will be treated in the conventional manner in the furnace 10; and in this connection, the temperature in the furnace chamber 16 is reduced to approximately 1000° F. with the pressure at 12 in. Hg mercury vacuum. Thereafter the valve 28 is opened and the heating chamber is again pumped out to approximately .100 microns in approximately five minutes and after the temperature has been elevated to approximately 1500° F. The work part is then subjected to further heat treating for refining the grain structure of the metal. Nitrogen is again introduced into the heating chamber to reduce the vacuum to 12 in. Hg; and at this point, and with the furnace housing remaining at the subatmospheric pressure of approximately 12 in. Hg vacuum, the part is introduced into an oil quench. This hardens the metal in accordance with the usual metal treating practice.

Figure 3:
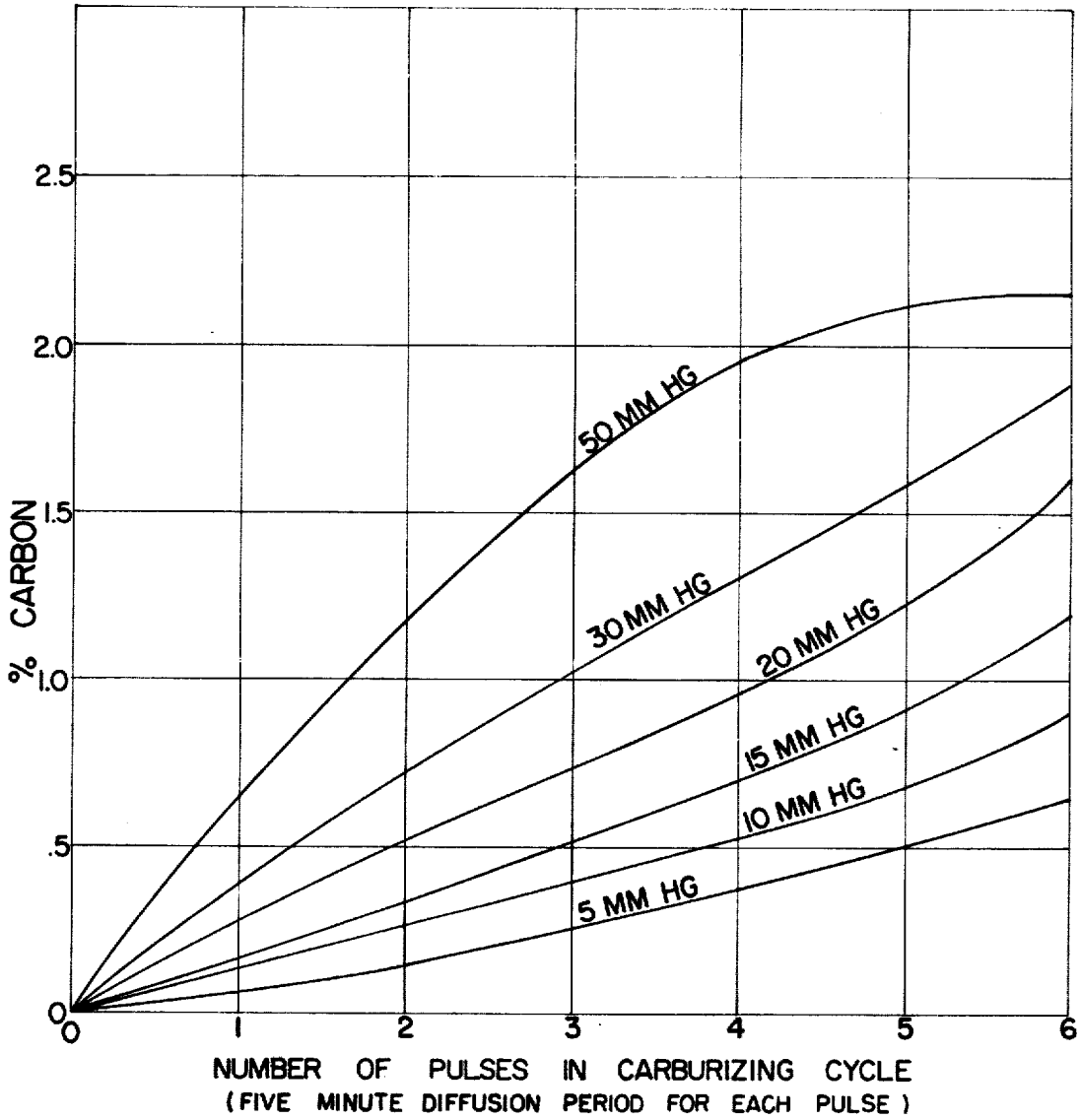
FIG. 3 is a graphical analysis of the treatment of a plurality of articles at a different chamber pressures and showing the relationship of the carbon absorbed in the articles to the number of pulses or times the carburizing gas is introduced into the chamber and evacuated therefrom.
Figure 4:
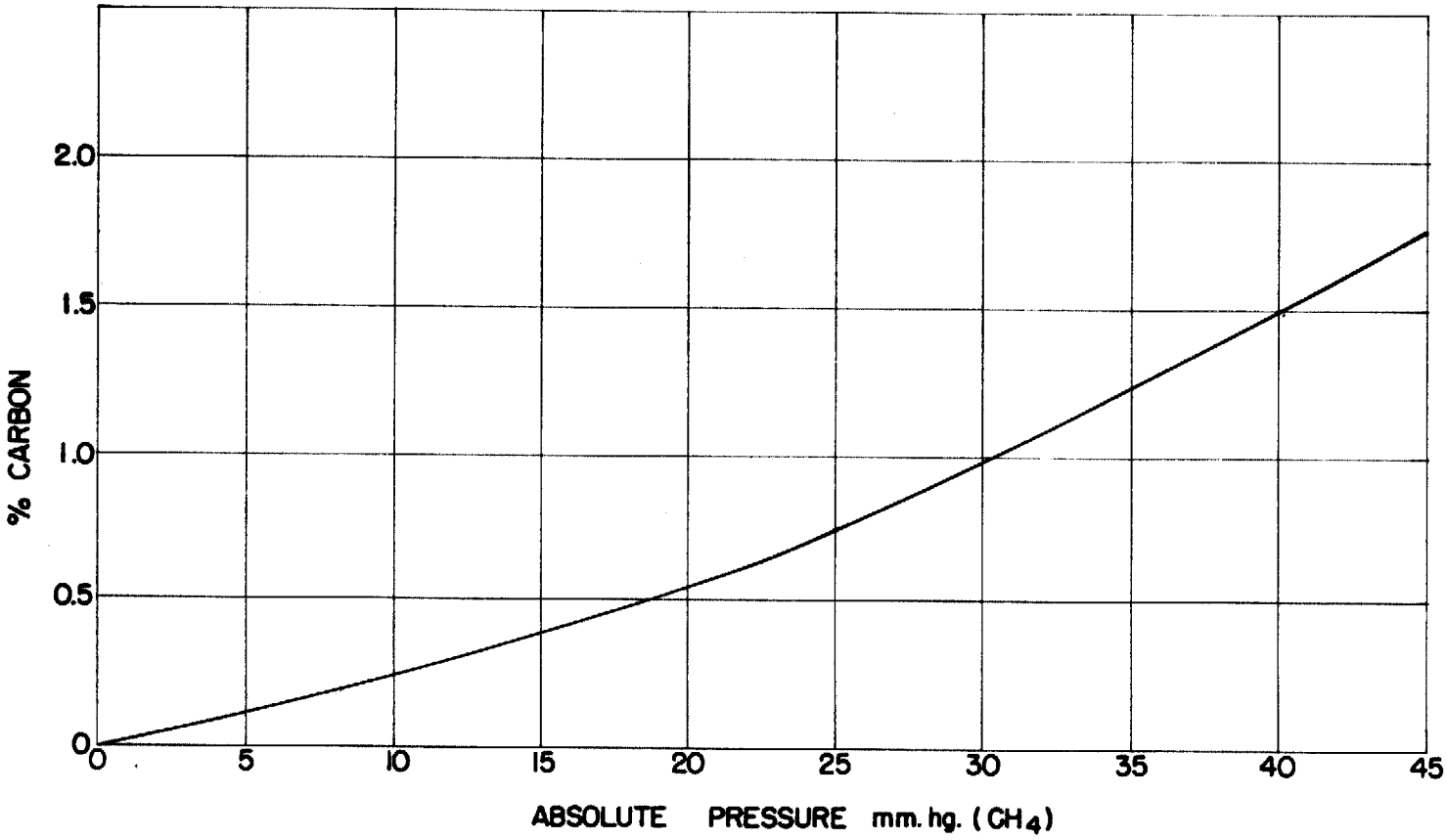
FIG. 4 is a graph illustrating the percent of carbon as diffused in a metal article as it relates to the absolute pressure of the chamber in which the metal article is located during the carburizing process.

As previously set forth above, it has been stated that the amount of carbon absorbed into an article treated is proportional to the absolute pressure in the heating chamber, and this principle is reflected in the graphs illustrated in FIGS. 3 and 4. In order to obtain the results illustrated in FIG. 3, six pieces of iron shim stock of approximately 0.005 inch thick and containing 0.08% carbon were individually carburized at a temperature of 1900° F. The absolute pressure in the furnace chamber was varied and each piece was subjected to a number of pulses of carburizing gas, the diffusion period of each pulse being set at approximately five minutes. As illustrated in FIG. 3, as the absolute pressure of the chamber was increased, the percentage of carbon absorbed in the case of the shim stock was increased up to approximately 2.2% saturation point. It is seen that the percentage of carbon absorbed in the work part is also proportional to the number of pulses used in the carburizing cycle.

As illustrated in FIG. 4, the percent of carbon absorbed into a metal part treated by the carburizing process is proportional to the absolute pressure of the carburizing gas in the heating chamber. This relationship is reflected in the curves illustrated in FIG. 3 described above; but as illustrated in the graph shown in FIG. 4, an acceptable percent of carbon for a carburized case as obtained by the process can be determined by preselecting the absolute pressure of the heating chamber when backfilled with the carburizing gas. As will be described in the examples set forth hereinafter, the absolute pressure in the heating chamber will be varied to produce acceptable carburized cases, depending upon the results required.

The following examples are presented to exemplify and further clarify the invention, but not to limit the invention:

EXAMPLE NO. 1

Figure 5:
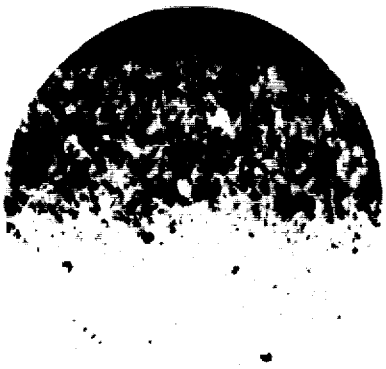
FIGS. 5 through 12 are photomicrographs of various metal articles as treated by the subject invention and illustrating carburized cases as obtained by the process under different operating conditions.

Referring to the photomicrograph illustrated in FIG. 5, a carburized case is illustrated that was obtained by treating a cam formed of a 1010 steel. The following conditions during the carburizing cycle were used with the results as indicated:

| | | |
|---|---|---|
| Material | 1610 steel | |
| Number of pulses of carburizing gas and diffusion period. | Three at five minutes | |
| Backfill pressure in chamber | 60 mm. Hg (vac.) | |
| Temperature in carburizing chamber | 1,900° F. | |
| Effective carburized case obtained on part | .020 inch | |
| | Case depth, inches | Rockwell C hardness |
| Traverse of case hardness of part after heat treating. | .002 | 61.1 |
| | .010 | 56.5 |
| | .020 | 58.0 |
| | .030 | 50.8 |

EXAMPLE NO. 2

Figure 6:
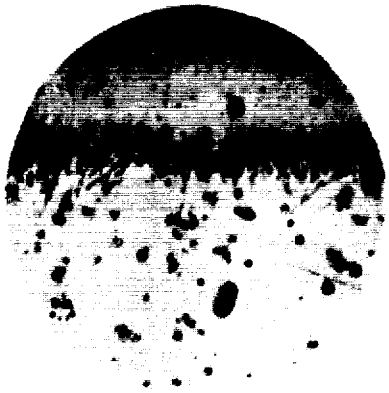

Referring to FIG. 6 a photomicrograph of a carburized case obtained on 2.5% silicon iron pole piece is illustrated. The results as obtained from the carburizing cycle indicated are as follows:

| | | |
|---|---|---|
| Material | Silicon-iron | |
| Number of pulses of carburizing gas and diffusion period. | Three at five minutes | |
| Backfill pressure in the chamber | 60 mm. Hg (vac.) | |
| Temperature in carburizing chamber | 1,900° F. | |
| Effective carburized case on part | .013 inch | |
| | Case depth, inches | Rockwell C hardness |
| Traverse of case hardness of part after heat treating. | .002 | 64.5 |
| | .005 | 61.5 |
| | .010 | 57.5 |
| | .015 | 49.5 |

EXAMPLE NO. 3

Figure 7:
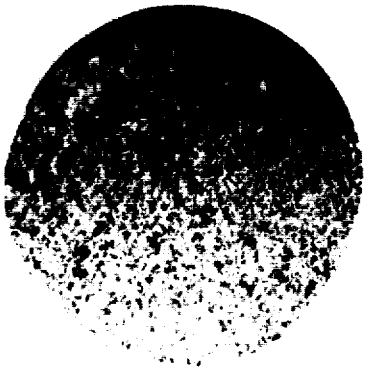

Referring to FIG. 7 a photomicrograph of a carburized case of 1524 steel is illustrated as treated by the following carburizing cycle.

| | | | |
|---|---|---|---|
| Material | 1524 steel | | |
| Number of pulses of carburizing gas and diffusion period. | Ten at five minutes | | |
| Backfill pressure in chamber | 25 mm. Hg (vac.) | | |
| Temperature in carburizing chamber | 1,900° F. | | |
| Effective carburized case on part | .020 inch | | |
| | Case depth, inches | Rockwell C hardness | Percent C |
| Traverse of case hardness of part after heat treating and percent C. | .002 | 53.2 | |
| | .010 | 51.8 | .74 |
| | .020 | 58.0 | .56 |

EXAMPLE NO. 4

Figure 9:
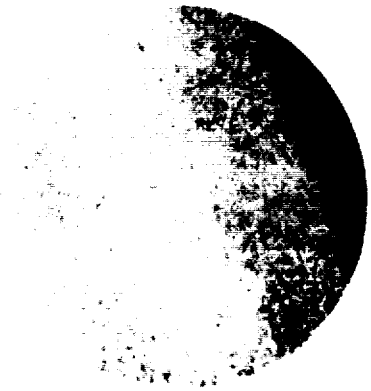
Figure 10:
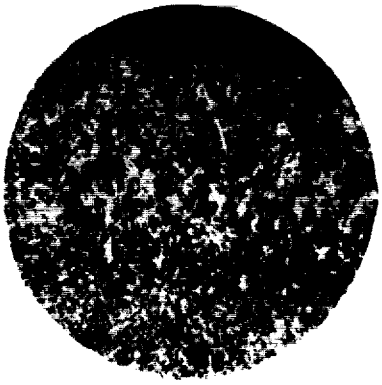

Referring to [FIG. 9, a photomicrograph] *FIGS. 9 and 10, photomicrographs* of [a portion] *portions* of a gear tooth formed of 1524 steel [is] *are* illustrated after carburizing. The following conditions obtained during the carburizing cycle with the results [are] as indicated:

| | | | |
|---|---|---|---|
| Material | 1524 steel | | |
| Number of pulses of carburizing gas and diffusion period. | Ten at five minutes | | |
| Backfill pressure of carburizing gas in chamber. | 54 mm. Hg (vac.) | | |
| Carburizing temperature in chamber | 1,900° F. | | |
| Effective carburized case on part | .020 inch | | |
| | Case depth, inches | Rockwell C Hardness | Percent C |
| Traverse of case hardness of part after heat treating and percent C. | .002 | 54.2 | |
| | .010 | 56.2 | 1.84 |
| | .020 | 55.5 | 1.44 |

EXAMPLE NO. 5

Figure 8:
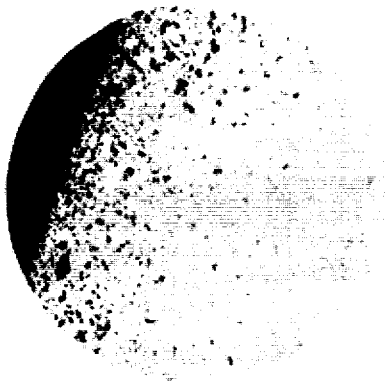

A gear formed of 1524 steel and similar to the gear carburized *and* described in Example 4 above and illustrated in FIG. 9, is illustrated in the photomicrograph shown in FIG. 8, and in this example carburizing was attempted without pulsing of the carburizing gas. In this example, a carburizing pressure of 45 mm. Hg (vac.) was maintained in the heating chamber at 1900° F. and a single shot of carburizing gas was introduced into the heating chamber and maintained therein for seventy minutes. After the carburizing gas was evacuated from the chamber and the part thereafter inspected, an effective case of 0.010 inch was observed. There was no appreciable increase in the percent of carbon in the case.

EXAMPLE NO. 6

Figure 11:
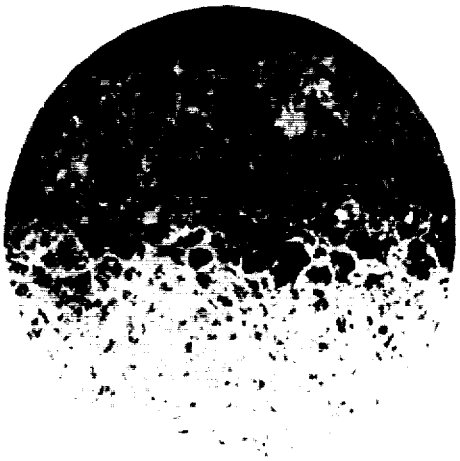

The tests as conducted for the results obtained in Example No. 6 herein and Example No. 7 indicated below, were for the purpose of illustrating the relationship between the case depth obtained and the number of pulses used in the carburizing cycle. Referring to FIG. 11, a part of 1117 steel is shown after carburizing wherein the carburized case therein was obtained under the following conditions:

| | | |
|---|---|---|
| Material | 1117 steel | |
| Number of pulses of carburizing gas and diffusion period. | Three at five minutes | |
| Backfill pressure of carburizing gas in chamber | 20 mm. Hg (vac.) | |
| Carburizing temperature | 1,900° F. | |
| Effective carburized case on part | 1025 inch | |
| | Case depth, inches | Percent C |
| Comparison of case depth and percent C | .010 | .96 |
| | .020 | .77 |
| | .030 | .45 |

EXAMPLE NO. 7

Figure 12:
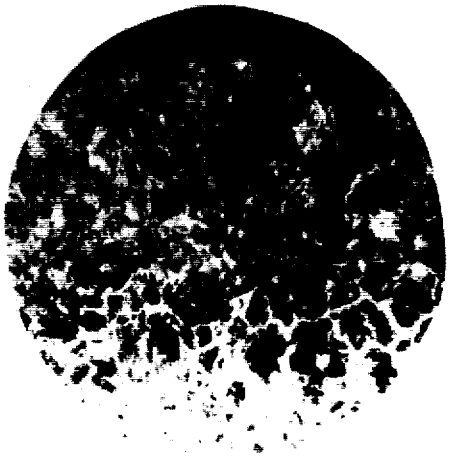

Referring to the photomicrograph illustrated in FIG. 12 a work piece of 1117 steel corresponding to that carburized as set forth in Example 6 was processed, but six pulses of carburizing gas were introduced into the furnace chamber during the carburizing cycle. The results as obtained illustrate that the depth of case is directly related to the number of pulses of the carburizing gas introduced into the furnace chamber. As shown in FIG. 12, the case depth is approximately 50% greater than that in FIG. 11, and as noted, twice the number of pulses of carburizing gas were used in the carburizing cycle. The conditions of the carburizing cycle and the results obtained are as follows:

| | | |
|---|---|---|
| Material | 1117 steel | |
| Number of pulses of carburizing gas and diffusion period. | Six at five minutes | |
| Carburizing pressure in chamber | 20 mm. Hg (vac.) | |
| Carburizing temperature | 1,900° F. | |
| | Case depth, inches | Percent C |
| Comparison of case depth and percent C | .010 | 1.01 |
| | .020 | .90 |
| | .030 | .69 |
| | .040 | .44 |
| | .050 | .30 |

In additional examples a part of sintered stainless steel was carburized by introducing a single shot of carburizing gas into the heating chamber operated at 1900° F. A diffusion period of twenty minutes produced a case of 0.010 inch.

A part of sintered iron having 3% copper was carburized by introducing a single shot of carburizing gas into the heating chamber operated at 1900° F. A diffusion period of twenty minutes also produced a case of 0.010 inch.

The process was incorporated in a brazing technique wherein a steel part was brazed to another steel part with 1010 copper brazing by first heating the chamber to 2050° F. Thereafter the temperature in the chamber was lowered to 1900° F. and a normal carburizing cycle carried out.

It is seen that the carburizing process as embodied in the present invention essentially relates to a method of changing the surface chemistry of the metal by addition of carbon through absorption and thermal diffusion. By providing that the process is carried out in an evacuated chamber, certain desirable results are obtained that were not possible by the previous carburizing processes. In this connection it is contemplated that the evacuation range may be as low as $10^{-10}$ mm. Hg. As described hereinabove and as indicated in the examples noted, the carburizing process has been carried out in a wide range of carburizing pressures and the pressure of the carburizing gas may vary from zero up to the saturation point thereof in the furnace chamber. Normally the pressure will vary according to each case since the carbon as absorbed into the work piece is proportional to the absolute pressure in the carburizing chamber.

The total pressure of the carburizing gas is used as a means of determining the partial pressure of the carbon in the heating chamber during the carburizing cycle. In this connection, the partial pressure of the carbon may vary in accordance with the surface area of the work parts being carburized and in order to maintain a preselected carbon potential, the backfill pressure of the carburizing gas is adjusted accordingly.

As previously mentioned hereinabove, the temperature range as contemplated during the carburizing cycle will also vary, and this will depend upon the material that is being processed. The temperature in the carburizing chamber could go up to 5000° and this of course would be compatible with the furnace equipment and the article being heat treated.

It is essential that carburizing be carried out in an environment that is free of impurities. The present invention is particularly conductive to providing an impurity free environment, since relatively high temperatures may be used in the heating chamber during evacuation. Thus all surface contaminants on the material are removed as well as impurities resulting from oxidizing of any parts of the heating chamber.

Figure 13:
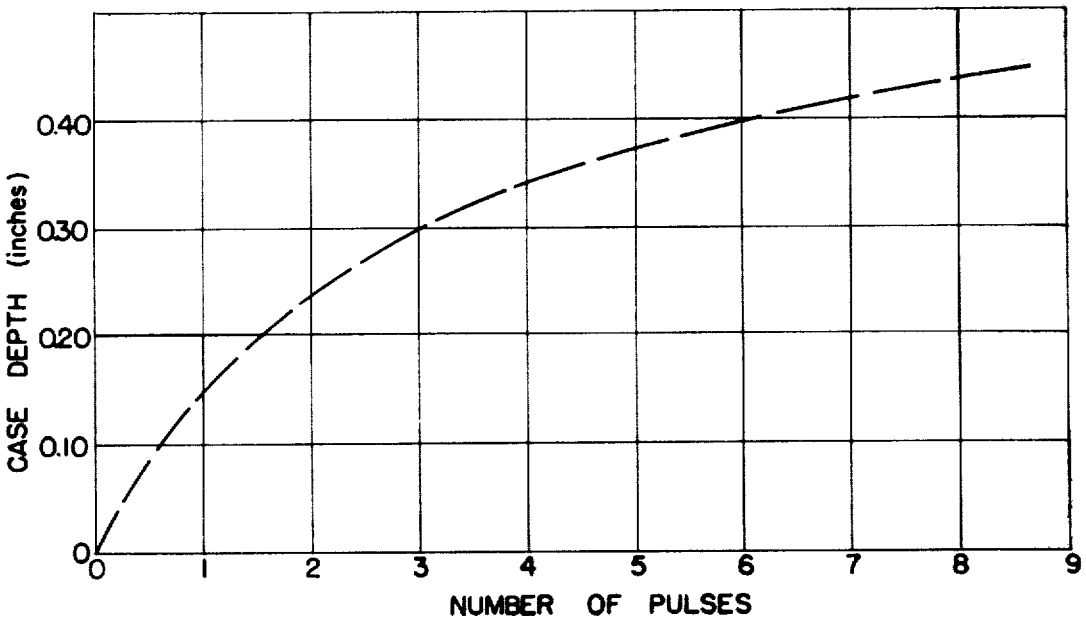
FIG. 13 is a graph illustrating the relation of the depth of the carburized case obtained by the present invention as it relates to the number of pulses or the times that the carburizing gas is introduced into the evacuated furnace chamber and withdrawn therefrom.

Another unique feature of the subject invention is the precise control of the depth of case and of the percent of carbon in the case obtained by the carburizing process. This precise control is possible by introducing a source of carbon into the evacuated chamber such as methane gas and controlling the concentration of carburization by pressure and temperature. Since relatively high temperatures are employed together with relatively high vacuums, the required result may be obtained by simply preselecting the number of pulses of the carburizing gas to be introduced into the chamber and the vacuum at which the carburizing gas is maintained in the chamber. *FIG. 13 also indicates that case depth obtained is a function of the number of pulses selected in a cycle.*

Although the invention as described herein is applicable to a batch process, that is, carburizing a batch of material in the furnace 10, it is contemplated that the process can be carried out in a continuous manner, it only being necessary that a vacuum furnace be employed that would include air-vacuum locks at the entrance and discharge sides of the furnace.

It is further seen that the time factor for carburizing by the present invention is greatly reduced over that experienced in the prior known processes. In this connection, prior known gas carburizing processes have taken as long as fourteen hours to carburize parts. In comparison, carburizing the same parts by the subject process requires only two and one half to three hours. In most instances, conventional gas carburizing requires more than double the time of the present process, and the present invention has the added advantage of precisely controlling the carburizing conditions to obtain a desired depth of case and carbon potential. The process is carried out in an absolutely clean environment exteriorly and interiorly of the furnace, and the parts as carburized when they are removed from the furnace have a bright and smooth surface and do not require any additional cleaning. Since city gas is normally used and is passed through the dryer 52 to remove the impurities therefrom, the process as performed is pollution free, and this is in sharp contrast with present carburizing processes that continuously vent the endothermic gases through a stack. Further, since an endothermic gas carrier is not required by the subject invention, the usual endothermic gas generator normally included as standard equipment in the usual carburizing process, is eliminated by the subject invention.

As described, the vacuum carburizing process is performed in an absolutely clean environment that is possible because of the high vacuums and temperatures used. As a result there are no oxidizing problems encountered in startup or during operation, and it is seen that not as much of the carburizing atmosphere is required during the process. Precise control of the process also serves to reduce the amount of carburizing gas required in the operation of the furnace.

It should be noted again that the use of the graphite heating elements and insulation members as provided in the heating chamber of the subject invention enable the high temperatures to be obtained in the furnace for the carburizing cycle. These temperatures have not been used heretofore for carburizing; and if they were used in a conventional atmosphere furnace, there would be a complete break down of the furnace heating elements and the other components that define the furnace interior. It is further emphasized that the vacuum technique as employed in the subject carburizing process not only removes impurities from the furnace interior and the surface of the metal parts being treated, but the surface of the metal is prepared so that absorption and thermal diffusion of the carbon during the process is more easily obtained. Lastly, the technique as developed in the subject invention for alternately introducing the carburizing gas into the furnace chamber and then evacuating it through a series of pulses produced the necessary circulation of the carbon material on the surface of the article to provide for the required diffusion into the surface. This pulsing effect is so controlled and is related to carbon potential and case depth that precise results can be predetermined by presetting the controls as required.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A method of carburizing a metallic article in a subatmospheric environment to produce a preselected amount of surface absorbed carbon and diffused gradient of carbon in said article, comprising the steps of heating the article in a heating chamber in a subatmospheric environment having a pressure in the range of approximately 0.2 to $10^{-10}$ mm. Hg, wherein adsorbed gases and other impurities are removed from said article and the surfaces thereof are cleaned, periodically introducing a source of carbon into said chamber and thereafter evacuating said chamber to generate one or more pulses of the carbon source in said chamber so as to remove unwanted waste reactants produced by the source of carbon and to promote effective circulation of carbon vapor around said article, each of said pulses including backfilling said chamber with a carburizing gas to a pressure that is maintained at subatmospheric conditions, the carburizing gas defining the source of carbon and forming active carbon vapor and waste reactants in said chamber after being admitted therein, each pulse including the removal of the waste reactants from the chamber during the period of carbon absorption into said article and following each backfilling operation of admitting the carburizing gas into said chamber, controlling the amount of carburizing gas admitted into said heating chamber in each backfilling operation in proportion to the partial pressure of the carbon vapor in said chamber, wherein the partial pressure of the carbon vapor is maintained at a value from zero up to and including the saturation point of the carbon vapor in said chamber, so that effective absorption and diffusion of carbon into said article is obtained at a controlled rate to produce a uniform case or preselected carbon potential in said article.

2. A method of carburizing as claimed in claim 1, said carburizing gas being methane ($CH_4$).

3. A method of carburizing as claimed in claim 1, the pressure in said heating chamber after backfilling with said carburizing gas being maintained in the range of approximately 20–80 mm. Hg.

4. A method of carburizing as claimed in claim 1, the temperature in said heating chamber during the carburizing of said article being in the range of approximately 1300° F. to 4000° F.

*5. A method of carburizing a metallic article in a subatmospheric environment to produce a preselected amount of surface absorbed carbon and diffused gradient of carbon in said article, comprising the steps of heating the article in a heating chamber in a subatmospheric environment, wherein adsorbed gases and other impurities are removed from said article and the surfaces thereof are cleaned, periodically introducing a source of carbon into said chamber and thereafter evacuating said chamber to generate one or more pulses of the carbon source in said chamber so as to remove unwanted waste reactants produced by the source of carbon and to promote effective circulation of carbon vapor around said article, each of said pulses including backfilling said chamber with a carburizing gas to a pressure that is maintained at subatmospheric conditions, the carburizing gas defining the source of carbon and forming active carbon vapor and waste reactants in said chamber after being admitted therein, each pulse including the removal of the waste reactants from the chamber during the period of carbon absorption into said article and following each backfilling operation of admitting the carburizing gas into said chamber, controlling the amount of carburizing gas admitted into said heating chamber in each backfilling operation in proportion to the partial pressure of the carbon vapor in said chamber, so that effective absorption and diffusion of carbon into said article is obtained at a controlled rate to produce a uniform case of preselected carbon potential in said article.*

* * * * *